(12) United States Patent
Vassilieva et al.

(10) Patent No.: US 9,785,631 B2
(45) Date of Patent: Oct. 10, 2017

(54) IDENTIFICATION AND EXTRACTION OF ACRONYM/DEFINITION PAIRS IN DOCUMENTS

(75) Inventors: Natalia Vassilieva, St. Petersburg (RU); Anna Yarygina, St. Petersburg (RU)

(73) Assignee: ENTIT SOFTWARE LLC, Sunnyvale, CA (US)

(*) Notice: Subject to any disclaimer, the term of this patent is extended or adjusted under 35 U.S.C. 154(b) by 1309 days.

(21) Appl. No.: 13/422,139

(22) Filed: Mar. 16, 2012

(65) Prior Publication Data
US 2013/0246047 A1    Sep. 19, 2013

(51) Int. Cl.
*G06F 17/27*    (2006.01)

(52) U.S. Cl.
CPC .................... *G06F 17/278* (2013.01)

(58) Field of Classification Search
CPC ........... G06F 17/2735; G06F 17/30864; G06F 17/2795; G06F 17/30595; G06F 17/278; G06F 17/28
See application file for complete search history.

(56) References Cited

U.S. PATENT DOCUMENTS

| | | | |
|---|---|---|---|
| 6,966,030 B2 * | 11/2005 | Ashford et al. ............... | 715/259 |
| 7,136,876 B1 * | 11/2006 | Adar et al. | |
| 7,236,923 B1 * | 6/2007 | Gupta ............................. | 704/9 |
| 7,536,297 B2 * | 5/2009 | Byrd et al. ...................... | 704/10 |
| 8,316,007 B2 * | 11/2012 | Liao ............................... | 707/709 |
| 8,498,999 B1 * | 7/2013 | Bhalotia ........................ | 707/767 |
| 8,589,370 B2 * | 11/2013 | Feng et al. .................... | 707/705 |
| 2003/0018670 A1 * | 1/2003 | Ashford et al. ............... | 707/532 |
| 2003/0139921 A1 * | 7/2003 | Byrd et al. ..................... | 704/10 |
| 2008/0033714 A1 * | 2/2008 | Gupta ............................. | 704/9 |
| 2009/0006359 A1 * | 1/2009 | Liao ............................... | 707/5 |
| 2010/0228711 A1 * | 9/2010 | Li et al. ......................... | 707/706 |
| 2012/0084076 A1 * | 4/2012 | Boguraev et al. ............. | 704/9 |
| 2012/0109974 A1 * | 5/2012 | Feng et al. .................... | 707/748 |
| 2012/0330648 A1 * | 12/2012 | Boguraev et al. ............. | 704/9 |

FOREIGN PATENT DOCUMENTS

JP        1137367        5/1989

OTHER PUBLICATIONS

Nadeau, David, and Peter Turney. "A supervised learning approach to acronym identification." (2005).*

(Continued)

*Primary Examiner* — Matthew Baker (57) ABSTRACT

A method and apparatus that can extract domain-specific acronyms and their definitions from large documents is disclosed. Strings of characters indicative of candidate acronyms within a portion of a document may be identified and extracted. Definitions for each selected string of characters may be extracted from text within the document proximal to that string of characters. Candidate acronym/definition pairs may be created for each selected string of characters based on the string of characters and their definitions. A classification system may be iteratively applied to the candidate acronym/definition pairs to create or update an acronym/definition pair dictionary for the document.

14 Claims, 6 Drawing Sheets

(56) References Cited

OTHER PUBLICATIONS

Wong, Wilson, Wei Liu, and Mohammed Bennamoun. "Integrated scoring for spelling error correction, abbreviation expansion and case restoration in dirty text." Proceedings of the fifth Australasian conference on Data mining and analystics—vol. 61. Australian Computer Society, Inc., 2006.*

Larkey, Leah S., et al. "Acrophile: an automated acronym extractor and server." Proceedings of the fifth ACM conference on Digital libraries. ACM, 2000.*

Yeates, Stuart. "Automatic Extraction of Acronyms from Text." New Zealand Computer Science Research Students' Conference. 1999.*

Sánchez, David, and David Isern. "Automatic extraction of acronym definitions from the Web." Applied Intelligence 34.2 (2011): 311-327.*

Park, Youngja, and Roy J. Byrd. "Hybrid text mining for finding abbreviations and their definitions." Proceedings of the 2001 conference on empirical methods in natural language processing. 2001.*

Yeates, Stuart, David Bainbridge, and Ian H. Witten. "Using compression to identify acronyms in text." arXiv preprint cs/0007003 (2000).*

Rafeeque et al, "Text Mining for Finding Acronym-Definition Pairs from Biomedical Test Using Pattern matching Method with Space Reduction Heuistics".

* cited by examiner

IDENTIFICATION AND EXTRACTION OF ACRONYM/DEFINITION PAIRS IN DOCUMENTS

BACKGROUND

Various documents may contain domain specific acronyms that may not be universally known. Identifying previously unrecognized acronyms and their definitions may add to a user community's understanding of a particular domain or topic. Extracting such domain-specific acronyms and their definitions from documents can be challenging when high recall and precision is desired. High recall refers to the ability to recognize all acronyms and their definitions in a document. Precision refers to the accuracy with which a system can recognize an acronym and its definition as measured by the portion of correctly identified pairs among all found pairs.

SUMMARY

A method and apparatus that can extract domain-specific acronyms and their definitions from large documents is disclosed. Strings of characters indicative of candidate acronyms within a portion of a document may be identified and extracted. Definitions for each selected string of characters may be extracted from text within the document proximal to that string of characters. Candidate acronym/definition pairs may be created for each selected string of characters. A classification system may be iteratively applied to the candidate acronym/definition pairs to create or update an acronym/definition pair dictionary for the document.

DETAILED DESCRIPTION

Presented herein is an iterative approach to extract domain-specific acronyms and their definitions from large documents in which high recall is desired and user feedback is available. Initially, acronym candidates may be extracted using a relatively weak regular expression filter designed to identify possible acronym structures. The weak regular expression typically results in high recall but low precision rates. Definitions may then be constructed for each acronym candidate. The definitions may be gleaned from the surrounding text. A classification model may then be used to select genuine acronym-definition pairs. The classification model exploits a user feedback mechanism to tune the classification model for each particular document resulting in reasonably high precision and high recall. In addition, the approach described herein is adaptive to particular documents. Thus, it is not simply a generic domain independent acronym extraction scheme.

For instance, at the acronym extraction phase, regular expressions are usually applied that exploit a specific set of features such as the length of acronyms, uppercase letters and special symbols in acronyms, brackets surrounding acronyms in text, etc. Some regular expressions, however, may be naive and select acronyms with high accuracy but miss a lot of less known patterns. Other regular expressions may be too broad resulting in too many false positive acronyms.

The acronym extraction phase may be followed by a filtering step in which extracted acronyms may be matched with a dictionary of common words and known acronyms. This filtering may improve the precision of a selected set of acronyms but may still miss some acronyms.

Acronym-definition filtering rules may then be applied for dictionary refinement purposes. Acronym-definition filtering, however, calls for significant manual work to adapt it to a particular set of documents. Machine learning techniques may also refine the dictionary of candidate acronym-definition pairs. However, sets of features for classification and classification algorithms vary and the limited set of features is usually limited to the contextual features and features of the acronym and definition. Moreover, dictionary refinement techniques are generally based on a fixed training set that does not change over time. Thus, processing a significantly different document may provide unacceptable quality.

The approach presented herein introduces an iterative dictionary refinement technique exploiting user feedback that enables the acronym/definition extraction process to adapt to specific documents.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
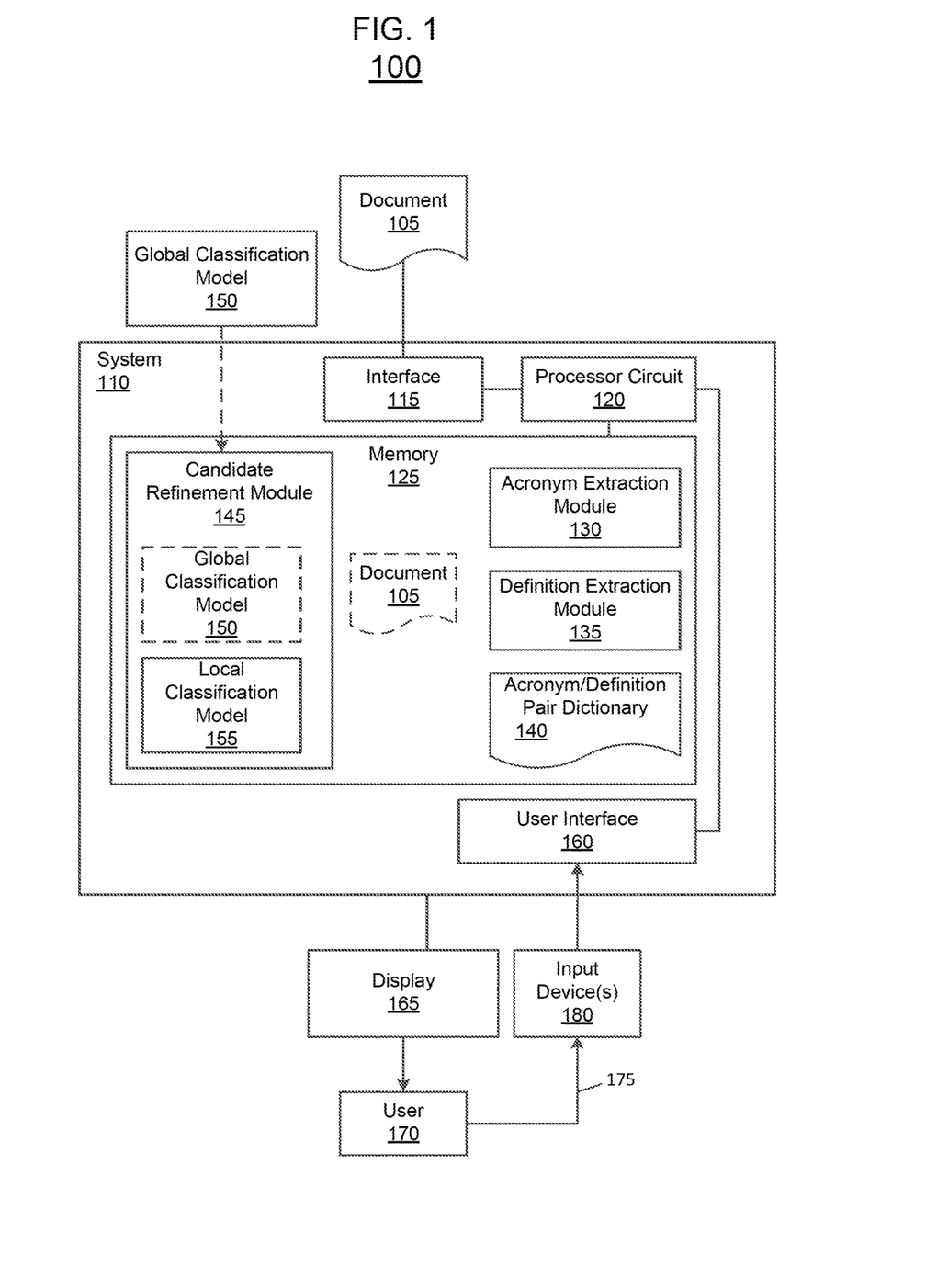
FIG. 1 illustrates one embodiment of an acronym/definition extraction system.

FIG. 1 illustrates a block diagram for an acronym/definition extraction system 100. A computer system 110 is generally directed to extracting acronyms and associated definitions from a document 105 to be placed in an acronym/definition pair dictionary 140. In one embodiment, the computer system 110 includes an interface 115, a processor circuit 120, a memory 125, and a user interface 160. A display 165 may be coupled with the computer system 110 to provide a visual indication of certain aspects of the acronym/definition extraction process to facilitate user feedback. A user 170 may interact with the computer system 110 via input devices 180 that are communicable with the user interface 160. Input devices 180 may include, but are not limited to, typical computer input devices such as a keyboard, a mouse, a stylus, a microphone, etc. In addition, the display 165 may be a touchscreen type display capable of accepting input upon contact from the user 170 or an input device 180.

A document 105 may be input into the computer system 110 via an interface 115 to be stored in memory 125. The interface 115 may be a scanner interface capable of converting a paper document to an electronic document. Alternatively, the document 105 may be received by the computer system 110 in an electronic format via any number of known techniques and placed in memory 125. Similarly, a global classification model 150 trained on known acronym/definition pairs may be obtained from an outside source and loaded into memory 125 by means that are generally known in the art of importing data into a computer system 110.

The memory 125 may be of any type suitable for storing and accessing data and applications on a computer. The memory 125 may be comprised of multiple separate memory devices that are collectively referred to herein simply as "memory 125". Memory 125 may include, but is not limited to, hard drive memory, external flash drive memory, internal read access memory (RAM), read-only memory (ROM), cache memory etc. The memory 125 may store an acronym extraction module 130 that when executed by the processor circuit 120 can execute an application that parses the document 105 to search for candidate acronyms.

Candidate acronyms may be identified by evaluating strings of characters against a regular expression that is indicative of a generic acronym structure. A candidate acronym may be a string of alphanumeric and/or symbolic characters that do not form a typical word in the context of document 105. The regular expression may include a combination of alphanumeric symbols and non-alphanumeric symbols. If a selected string of characters satisfies the regular expression it may be identified as a candidate acronym.

An example of a regular expression may be given as:
[=\\(,.-]+
[0-9a-zA-Z-]*
(([A-Z]+[ ][A-Z}+)|([A-Z]+)|([0-9]))
['/0-9a-z\\)\\(A-Z&.-]*
(([A-Z]+[     ][A-Z}+)|([A-Z]+)|([0-9]))['/0-9a-z\\)\\(A-Z&.-]*
[-,=.\\)\\(]+

The regular expression may match substrings having two groups of uppercase letters or digits that may be joined together by other symbols. For example, the regular expression may take into account different symbols that may frame the acronym in text. This includes, but is not limited to, parentheses and various types of bracketing symbols. The regular expression set out above, for instance, may match many false acronyms but will enable extraction of acronyms with high recall. A candidate refinement module 145 utilizing user feedback 175 may then be used to improve the precision of the computer system 110 as is described in more detail below.

The memory 125 may also store a definition extraction module 135 that when executed by the processor circuit 120 can execute an application that finds and extracts definitions for candidate acronyms extracted from document 105. Definitions for candidate acronyms may be extracted by applying a set of heuristic rules to the text of the document 105.

The memory 125 may also store a candidate refinement module 145 that when executed by the processor circuit 120 can execute an application that analyzes the candidate acronym/definition pairs for accuracy. The candidate refinement module 145 may implement an iterative approach utilizing user feedback 175 to create and refine a local classification model 155 specific to the document 105 being processed. An acronym/definition pair dictionary 140 containing acronym/definition pairs previously not known may be created for the document 105.

The candidate refinement module 145 used to improve the precision of acronym identification may include a global classification model 150. The global classification model 150 may be comprised of acronym/definition pairs selected in advance and culled from known benchmarks of training examples. The number of training examples used for the global classification model 150 may be varied. The candidate refinement module 145 may also include a local classification model 155 that is generated based on user feedback 175 relating to the accuracy of the global classification model 150. In particular, the local classification model 155 may track the accuracy of the global classification model 150 through user feedback 175.

Although the computer system 110 shown in FIG. 1 has a limited number of elements in a certain topology, it may be appreciated that the computer system 110 may include more or less elements in alternate topologies as desired for a given implementation. The embodiments are not limited in this context.

Figure 2:
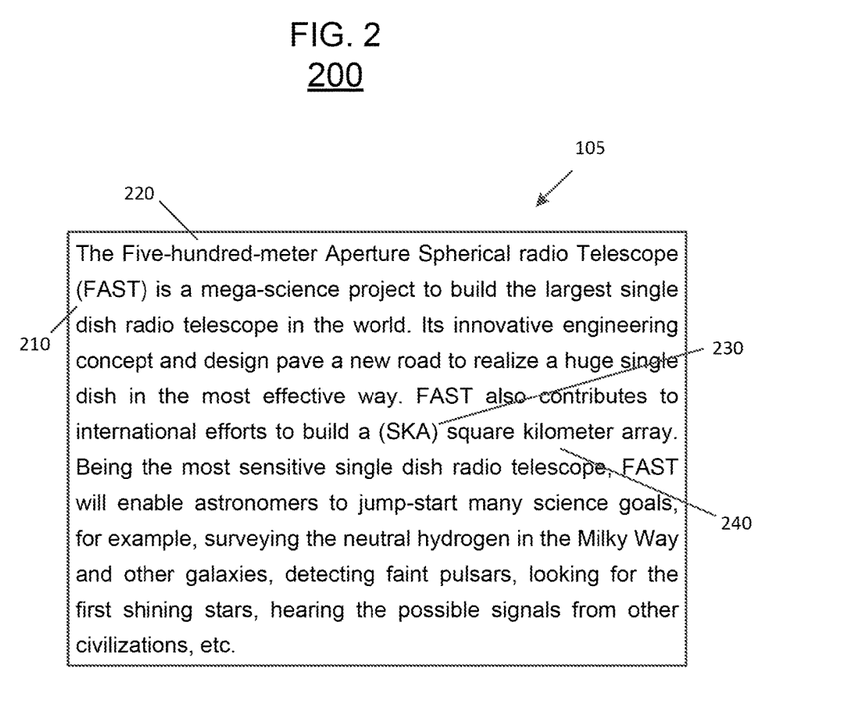
FIG. 2 illustrates an example text passage from a document.

FIG. 2 illustrates an example text passage 200 from a document 105. In this example, there are several candidate acronyms present. The first correct candidate acronym 210 "FAST" and the second correct candidate acronym 230 "SKA" are among of them. The text surrounding each initial instance of the candidate acronyms 210, 230 may be extracted for a definition provided it satisfies a set of definition extraction heuristics (e.g., rules). In this example, the text 220 to the left of "FAST" may provide a definition and the text 240 to the right of "SKA" may provide a definition. The process of extracting candidate acronyms 210, 230 and definitions 220, 240 is explained in more detail below.

Figure 3:
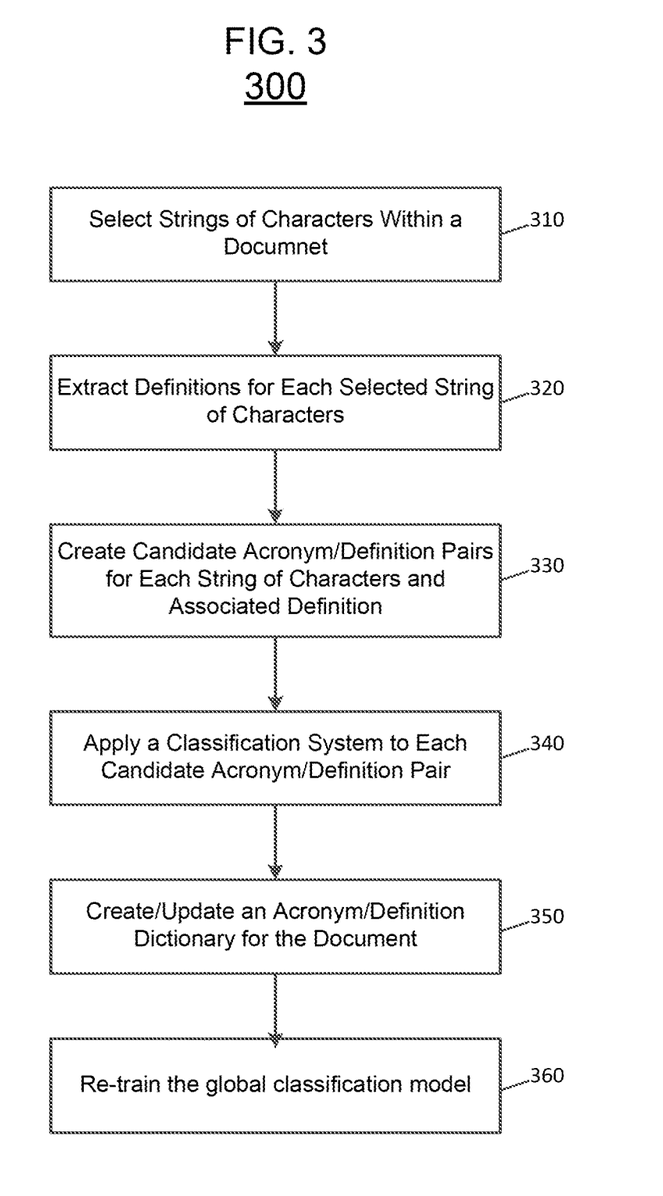
FIG. 3 illustrates one embodiment of a logic flow in which a document may be parsed for new acronyms and definitions.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation FIG. 3 illustrates one embodiment of a logic flow 300 in which a document may be parsed for candidate acronyms and definitions. The logic flow 300 may identify candidate acronyms, extract definitions for them from text within the document 105 proximal to the candidate acronyms and process them according to a classification system that includes user feedback. The logic flow 300 may be representative of some or all of the operations executed by one or more embodiments described herein.

In the illustrated embodiment shown in FIG. 3, the acronym extraction module 130 operative on the processor circuit 130 may identify and select candidate acronyms within a document at block 310. For instance, the acronym extraction module 130 may parse the document 105 to identify candidate acronyms (e.g., 210 and 230) that may match a generic acronym structure. The embodiments are not limited by this example.

In the illustrated embodiment shown in FIG. 3, the definition extraction module 135 operative on the processor circuit 130 may extract definitions for each candidate acronym at block 320. For instance, the definition extraction module 135 may analyze the text 220 surrounding candidate acronym 210 to determine if candidate acronym 210 is defined within document 105. The words surrounding the candidate acronym may be subjected to a set of definition extraction heuristics or rules designed to extract a definition for the candidate acronym 210 should the surrounding or proximal words satisfy the definition extraction heuristics. The embodiments are not limited by this example.

In the illustrated embodiment shown in FIG. 3, the definition extraction module 135 operative on the processor circuit 130 may create acronym/definition pairs at block 330. For instance, the definition extraction module 135 may link each candidate acronym with associated definitions. If the definition extraction module 135 is able to extract a definition for a candidate acronym that satisfies the definition extraction heuristics, the candidate acronym and the associated definition are paired together for further analysis. The embodiments are not limited by this example.

In the illustrated embodiment shown in FIG. 3, the candidate refinement module 145 operative on the processor circuit 130 may apply a classification system at block 340. For instance, the candidate refinement module 145 may utilize a global classification model 150 as a starting point for a first processing of candidate acronym/definition pairs from a first portion of the document 105. The global classification model 150 may be trained on acronym/definition pairs selected in advance and culled from known benchmarks. The candidate refinement module 145 may also utilize a local classification model 155 that is generated based on user feedback 175 on the accuracy of the dictionary validated with of the global classification model 150. The remainder of the document 105 may be analyzed and processed using an iterative approach in which the local classification model 155 may be applied to the next portion of the document 105. After each iteration, user feedback 175 is obtained and the local classification model 155 may be further refined. The process may be repeated until the entire document 105 has been analyzed. The embodiments are not limited by this example.

The document may be parsed into portions according to a set number of candidate acronyms per iteration. For instance, each iteration may be capped at addressing ten (10) acronym/definition pairs. Thus, once that number is reached, the iteration ends and user feedback 175 is solicited and received. The local classification model 155 is refined and applied to the next ten (10) acronym/definition pairs until the entire document has been analyzed. The embodiments are not limited by this example.

Alternatively, the document may be portioned according to a page count or word count. For instance, a thirty (30) page document may be divided into fifteen (15) two (2) page segments. Each iteration may cover two pages of the document before obtaining user feedback 175 and refining the local classification model 155. Similarly, a five-thousand (5,000) word document 105 may be divided into fifty (25) two-hundred (200) word segments in which each 200 word segment is an iteration. The numbers specified above for page counts, word counts and segments are illustrative only. The embodiments are not limited by these examples.

In the illustrated embodiment shown in FIG. 3, the candidate refinement module 145 operative on the processor circuit 130 may create or update an acronym/definition pair dictionary 140 at block 350. For instance, the candidate refinement module 145 may take the results from the local classification model 155 following analysis of each iteration of the document 105 and create or update an acronym/definition pair dictionary 140. The embodiments are not limited by this example.

In the illustrated embodiment shown in FIG. 3, the candidate refinement module 145 operative on the processor circuit 130 may re-train the global classification model 150 at block 360. For instance, the candidate refinement module 145 may collect all user feedback 175 and retrain the global classification model 150. A fixed-size training set may have been used for the global classification model 150. A newly constructed set of local examples that were determined from the user feedback 175 may replace some portion of old examples in the training set of the global classification model 150. Subsequently, the updated global classification model 150 may be used as the starting point for processing subsequent documents. The embodiments are not limited by this example.

Figure 4:
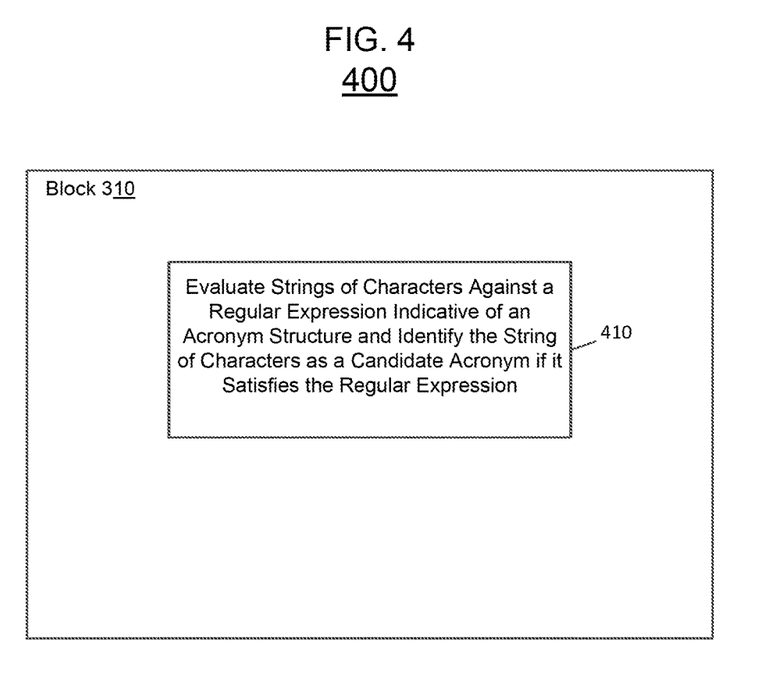
FIG. 4 illustrates one embodiment of a logic flow in which candidate acronyms may be extracted from a document.

FIG. 4 illustrates one embodiment of a logic flow 400 that is a more detailed explanation of block 310 of FIG. 3 in which candidate acronyms may be extracted from the document 105. The logic flow 400 may identify candidate acronyms according to a generic acronym structure as evaluated by the regular expression. The logic flow 400 may be representative of some or all of the operations executed by one or more embodiments described herein.

In the illustrated embodiment shown in FIG. 4, the acronym extraction module 130 operative on the processor circuit 120 may evaluate strings of characters within document 105 and identify a string of characters within document 105 as a candidate acronym at block 410. For instance, the acronym extraction module 130 may evaluate certain strings of characters against a regular expression. The regular expression may be indicative of the generic acronym structure mentioned above. A typical generic acronym structure may include framing symbols such as parentheses or brackets around a sequence of alphanumeric characters that do not necessarily spell a word such as "SKA" as illustrated in FIG. 2. The regular expression may recognize all capital letters in a string and additional symbols that are not alphanumeric. For instance, the acronym extraction module 130 may identify a candidate acronym when a string of characters satisfies the regular expression. Once candidate acronyms have been identified, definitions for each of the candidate acronyms may be extracted. The embodiments are not limited by this example.

Figure 5:
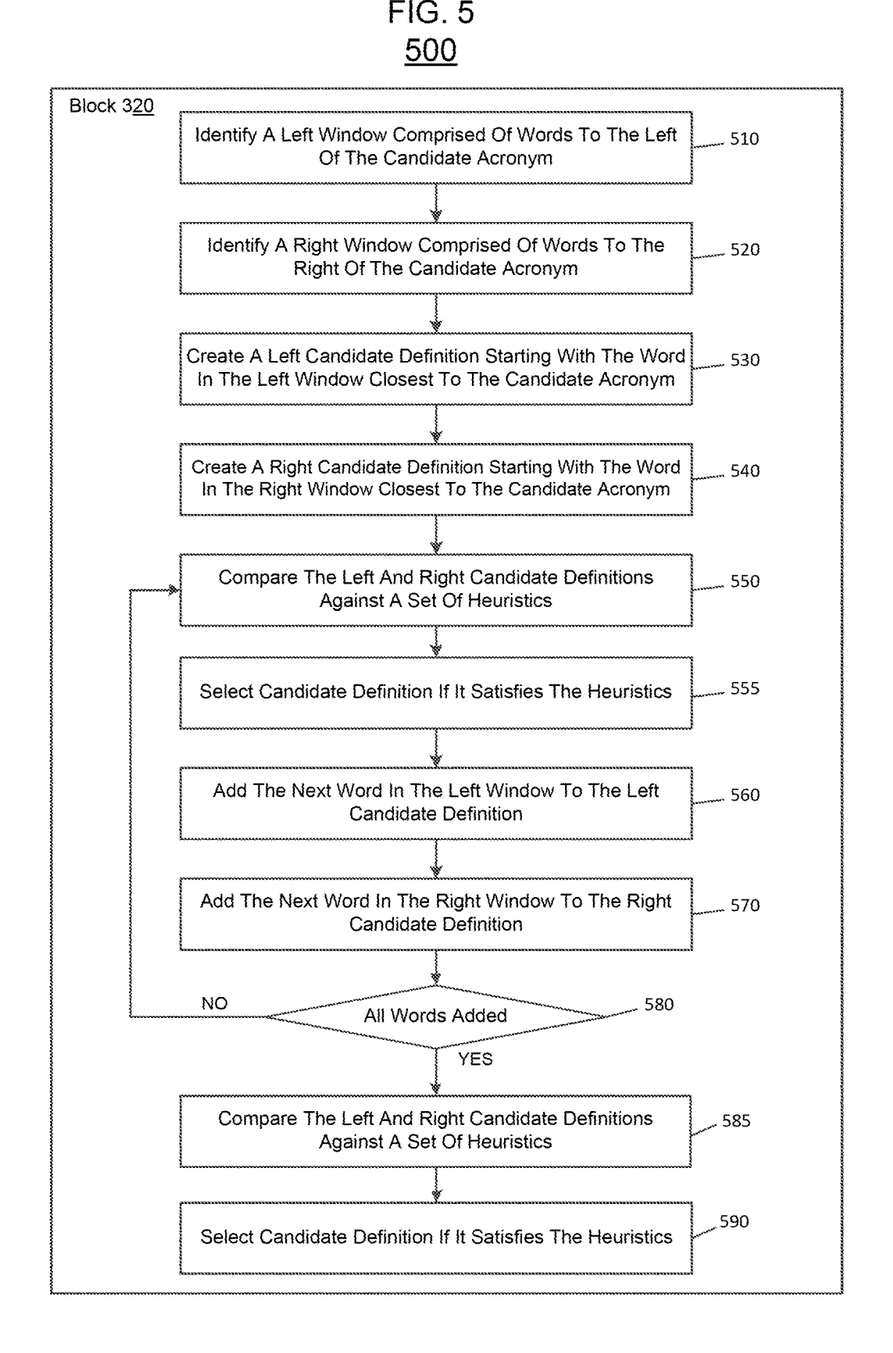
FIG. 5 illustrates one embodiment of a logic flow in which definitions for candidate acronyms may be extracted from the document.

FIG. 5 illustrates one embodiment of a logic flow 500 that is a more detailed explanation of block 320 of FIG. 3 in which definitions for candidate acronyms may be extracted from the document 105. The logic flow 500 may extract definitions according to a set of heuristic rules applied to text surrounding a candidate acronym. The logic flow 500 may be representative of some or all of the operations executed by one or more embodiments described herein.

In the illustrated embodiment shown in FIG. 5, the definition extraction module 135 operative on the processor circuit 120 may identify a left window at block 510. For instance, the definition extraction module 135 may identify a left window comprised of words to the left of the candidate acronym within document 105. The words may or may not form a definition for the candidate acronym. The embodiments are not limited by this example.

In the illustrated embodiment shown in FIG. 5, the definition extraction module 135 operative on the processor circuit 120 may identify a right window at block 520. For instance, the definition extraction module 135 may identify a right window comprised of words to the right of the candidate acronym within document 105. The words may or may not form a definition for the candidate acronym. The embodiments are not limited by this example.

In the illustrated embodiment shown in FIG. 5, the definition extraction module 135 operative on the processor circuit 120 may create a left candidate definition for a candidate acronym at block 530. For instance, the definition extraction module 135 may create a left candidate definition starting with the word in the left window closest to the candidate acronym. The embodiments are not limited by this example.

In the illustrated embodiment shown in FIG. 5, the definition extraction module 135 operative on the processor circuit 120 may create a right candidate definition for a candidate acronym at block 530. For instance, the definition extraction module 135 may create a right candidate definition starting with the word in the right window closest to the candidate acronym. The embodiments are not limited by this example.

In the illustrated embodiment shown in FIG. 5, the definition extraction module 135 operative on the processor circuit 120 may compare the left and right candidate definitions against a set of definition extraction heuristics at block 550. For instance, the definition extraction module 135 may compare the left and right candidate definitions against a set of definition extraction heuristics to determine if either candidate definition appears to define the candidate acronym. The embodiments are not limited by this example.

One such set of definition extraction heuristics may include, for example, the following rules. A candidate definition may include no more than eight (8) words. The first word of the left window may not be a stop word. The last word of the right window may not be a stop word. Stop words may be words that typically do not factor into the definition. Examples of some of the most common stop words include: the, is, at, which and on. At least one letter in the candidate acronym is the first letter in some word in the candidate definition. Substantially all characters in the candidate acronym appear in the candidate definition. The length of the candidate definition is less than one hundred (100) characters. The candidate definition contains at least one lowercase letter. The candidate acronym is not a substring of its candidate definition. A new word added to the candidate definition contains a letter from the candidate acronym. The candidate acronym is compared with an acronym generated from the first letters of each word in the candidate definition in which the Levenshtein distance between the candidate acronym and generated acronym is less than two (2).

The Levenshtein distance is a string metric for measuring the difference between two sequences. The Levenshtein distance between two strings is defined as the minimum number of edits needed to transform one string into the other, with the allowable edit operations being insertion, deletion, or substitution of a single character.

In the illustrated embodiment shown in FIG. 5, the definition extraction module 135 operative on the processor circuit 120 may select a candidate definition at block 555. For instance, the definition extraction module 135 may select a candidate definition that satisfies the heuristics. For instance, it may be anticipated that the candidate definition will have an associated definition either to its immediate right or left in the document 105. This would depend on whether the author of the document introduced the acronym first or the definition first. In the example shown in FIG. 2, the candidate acronym "FAST" 210 followed its definition 220 meaning the definition 220 would have been found in a left window only after a certain number of words had been added to the candidate definition. In contrast, the candidate acronym "SKA" 230 preceded its definition 240 meaning the definition 240 would have been found in a right window only after a certain number of words had been added to the candidate definition. The embodiments are not limited by these examples. In each case, the opposite window would not have satisfied the heuristics designed to extract a definition for a candidate acronym.

In the illustrated embodiment shown in FIG. 5, the definition extraction module 135 operative on the processor circuit 120 may add another word to the candidate definition at block 560. For instance, the definition extraction module 135 may add the next word in the left window to the left candidate definition. Referring to FIG. 2, the first word for the left window for the candidate acronym "FAST" may be "Telescope". The next word may be "radio" and the candidate definition may be "radio Telescope". The embodiments are not limited by this example.

In the illustrated embodiment shown in FIG. 5, the definition extraction module 135 operative on the processor circuit 120 may add another word to the candidate definition at block 570. For instance, the definition extraction module 135 may add the next word in the right window to the right candidate definition. The embodiments are not limited by this example. Referring to FIG. 2, the first word for the right window for the candidate acronym "SKA" may be "square". The next word may be "kilometer" and the candidate definition may be "square kilometer". The embodiments are not limited by this example.

In the illustrated embodiment shown in FIG. 5, the definition extraction module 135 operative on the processor circuit 120 may determine if all the words in the left and right windows have been added to the candidate definitions at block 580. For instance, the definition extraction module 135 may cause control of the definition extraction process to return to block 550 if all of the words for the left and right windows have not been added to the candidate definition yet. Once all the words for the left and right windows have been added to the candidate definition, control is passed to block 590. The embodiments are not limited by this example.

In the illustrated embodiment shown in FIG. 5, the definition extraction module 135 operative on the processor circuit 120 may compare the left and right candidate definitions against a set of definition extraction heuristics at block 585. For instance, the definition extraction module 135 may compare the left and right candidate definitions against a set of definition extraction heuristics to determine if either candidate definition appears to define the candidate acronym. The embodiments are not limited by this example.

In the illustrated embodiment shown in FIG. 5, the definition extraction module 135 operative on the processor circuit 120 may select a candidate definition at block 590. For instance, the definition extraction module 135 may select a candidate definition if it satisfies the heuristics. For instance, it may be anticipated that the candidate definition will have an associated definition either to its immediate right or left in the document 105. This would depend on whether the author of the document introduced the acronym first or the definition first. In the example shown in FIG. 2, the candidate acronym "FAST" 210 followed its definition 220 meaning the definition 220 would have been found in a left window. In contrast, the candidate acronym "SKA" 230 preceded its definition 240 meaning the definition 240 would have been found in a right window. The embodiments are not limited by these examples. In each case, the opposite window would not have satisfied the heuristics designed to extract a definition for a candidate acronym.

Figure 6:
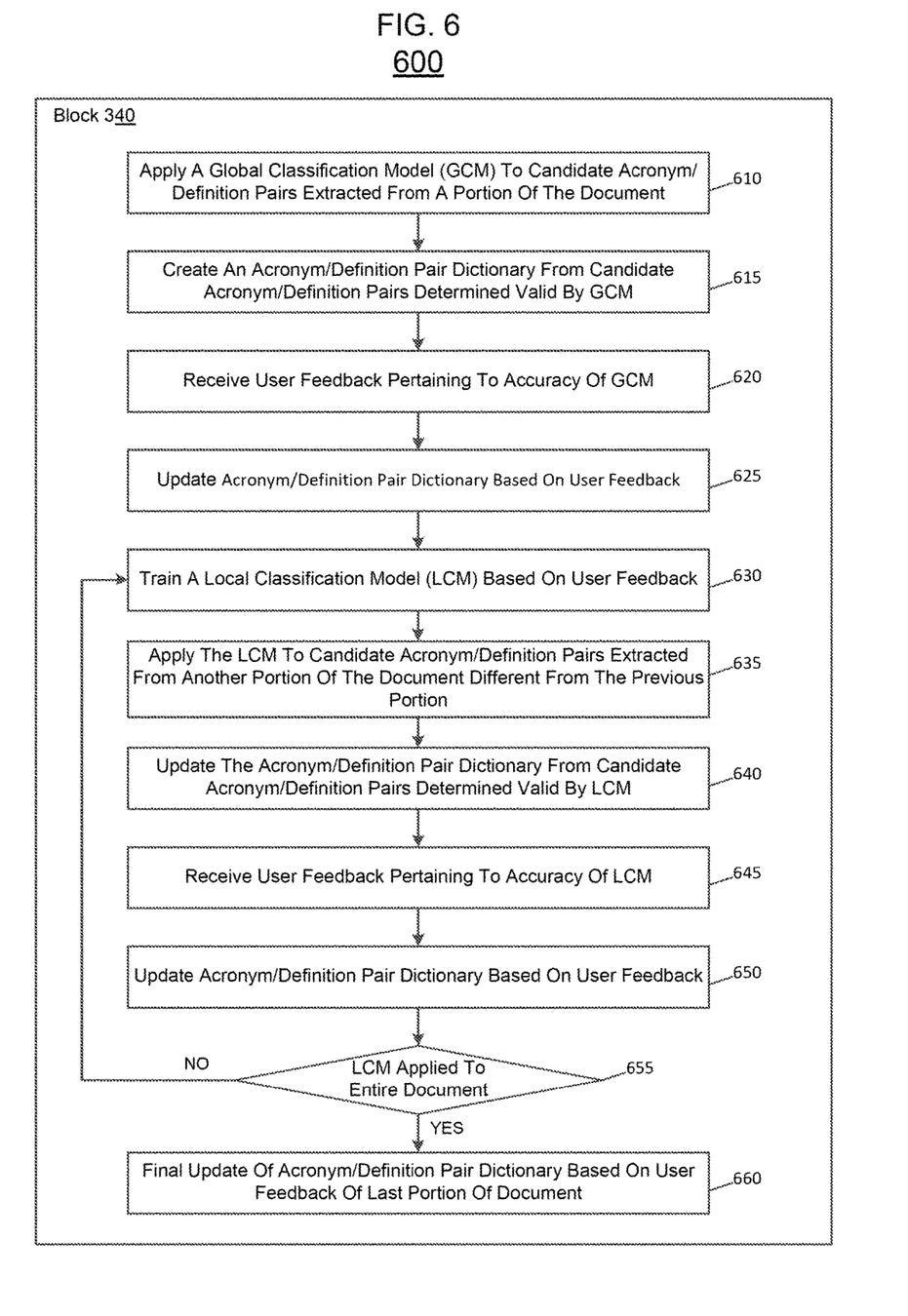
FIG. 6 illustrates one embodiment of a logic flow in which a classification process may be applied to candidate acronym/definition pairs extracted from document.

FIG. 6 illustrates one embodiment of a logic flow 600 that is a more detailed explanation of block 340 of FIG. 3 in which a classification process may be applied to candidate acronym/definition pairs extracted from document 105. The logic flow 600 may utilize a global classification model 150 in conjunction with user feedback 175 and a local classification model 155 to determine and verify newly identified acronym-definition pairs within the document 105. The logic flow 600 may be representative of some or all of the operations executed by one or more embodiments described herein.

In the illustrated embodiment shown in FIG. 6, the candidate refinement module 145 operative on the processor circuit 120 may apply a global classification model 150 at block 610. For instance, the candidate refinement module 145 may apply a global classification model 150 to candidate acronym/definition pairs extracted from a first portion of the document 105. The global classification model 150 may be comprised of acronym/definition pairs selected in advance and culled from known benchmarks. The global classification model 150 may be used as a starting point for a first processing of candidate acronym/definition pairs from a first portion of the document 105. The global classification model 150 may be applied to each of the candidate acronym/definition pairs to determine if the global classification model 150 recognizes a candidate acronym/definition pair. The embodiments are not limited by this example.

In the illustrated embodiment shown in FIG. 6, the candidate refinement module 145 operative on the processor circuit 120 may create an acronym/definition pair dictionary 140 at block 615. For instance, the candidate refinement module 145 may create an acronym/definition pair dictionary 140 from candidate acronym/definition pairs determined valid by the global classification model 150. The candidate acronym/definition pairs determined valid by the global classification model 150 may then be presented to a user 170 via display 165. The embodiments are not limited by this example.

In the illustrated embodiment shown in FIG. 6, the candidate refinement module 145 operative on the processor circuit 120 may receive user feedback 175 at block 620. For instance, the candidate refinement module 145 may receive user feedback 175 pertaining to the accuracy of the global classification model 150 as applied to the first set of candidate acronym/definition pairs. The user may be presented with a list of candidate acronym/definition pairs that the global classification model 150 has deemed valid. The user may provide feedback 175 by acknowledging whether the global classification model 150 correctly identified a candidate acronym/definition pair. The embodiments are not limited by this example.

In the illustrated embodiment shown in FIG. 6, the candidate refinement module 145 operative on the processor circuit 120 may update the acronym/definition pair dictionary 140 at block 625. For instance, the candidate refinement module 145 may update the acronym/definition pair dictionary 140 based on the user feedback 175. If the user 170 indicated that one or more candidate acronym/definition pairs were improperly classified by the global classification model 150, the acronym/definition pair dictionary 140 may be updated with the corrected information. The embodiments are not limited by this example.

In the illustrated embodiment shown in FIG. 6, the candidate refinement module 145 operative on the processor circuit 120 may train a local classification model 155 at block 630. For instance, the candidate refinement module 145 may train a local classification model 155 based on the user feedback 175. The corrected information resulting from the user feedback 175 may be used to train a local classification model 155. The local classification model 155 takes into account the specificity or domain (e.g., topic or subject matter) of the document 105. For the remaining portions of the document 105, the local classification model 155 may be applied iteratively to any candidate acronym/definition pairs. The embodiments are not limited by this example.

In the illustrated embodiment shown in FIG. 6, the candidate refinement module 145 operative on the processor circuit 120 may apply the local classification model 155 to candidate acronym/definition pairs at block 635. For instance, the candidate refinement module 145 may apply the local classification model 155 to candidate acronym/definition pairs extracted from a next portion of the document 105. The next portion of the document 105 is different from the previous portion that was just analyzed.

As described earlier, the document 105 may be parsed into portions. The size of the portions may be determined by a variety of factors. In one embodiment, the portions may be determined according to a set number of candidate acronyms. For instance, each portion may be capped at addressing ten (10) acronym/definition pairs. Thus, once that number is reached, that portion of the document 105 is terminated. In another embodiment, the document portions may be divided according to pages or word counts.

The local classification model 155 may be comprised of a set of training examples of acronym/definition pairs resulting from the training step at block 630. Each of the new candidate acronym/definitions extracted from the new portion of the document 105 may be applied to the local classification model 155 to determine if the local classification model 155 recognizes a candidate acronym/definition pair. The embodiments are not limited by this example.

In the illustrated embodiment shown in FIG. 6, the candidate refinement module 145 operative on the processor circuit 120 may update the acronym/definition pair dictionary 140 at block 640. For instance, the candidate refinement module 145 may update the acronym/definition pair dictionary 140 from candidate acronym/definition pairs determined valid by the local classification model 155. The candidate acronym/definition pairs determined valid by the local classification model 155 may then be presented to a user 170 via display 165. The embodiments are not limited by this example.

In the illustrated embodiment shown in FIG. 6, the candidate refinement module 145 operative on the processor circuit 120 may receive user feedback 175 at block 645. For instance, the candidate refinement module 145 may receive user feedback 175 pertaining to the accuracy of the local classification model 155 as applied to the current set of candidate acronym/definition pairs. The user may be presented with a list of candidate acronym/definition pairs that the local classification model 155 has deemed valid. The user may provide feedback 175 by acknowledging whether the local classification model 155 correctly identified a candidate acronym/definition pair. The embodiments are not limited by this example.

In the illustrated embodiment shown in FIG. 6, the candidate refinement module 145 operative on the processor circuit 120 may update the acronym/definition pair dictionary 140 at block 650. For instance, the candidate refinement module 145 may update the acronym/definition pair dictionary 140 based on the user feedback 175. If the user 170 indicated that one or more candidate acronym/definition pairs were improperly classified by the local classification model 155, the acronym/definition pair dictionary 140 may be updated with the corrected information. The embodiments are not limited by this example.

In the illustrated embodiment shown in FIG. 6, the candidate refinement module 145 operative on the processor circuit 120 may determine if the local classification model 155 has been applied to the entire document at block 655. For instance, the candidate refinement module 145 may check to ensure that the entire document 105 has been analyzed for acronym/definition pairs. If not, control may be returned to block 630 where the local classification model 155 is re-trained with the user feedback 175 for the most recent portion of the document 105 analyzed. The embodiments are not limited by this example.

If the entire document 105 has been analyzed for acronym/definition pairs, the candidate refinement module 145 operative on the processor circuit 120 may perform a final update on the acronym/definition pair dictionary 140 at block 660. The final update is the same as the update described with respect to block 650. The end result may be an acronym/definition pair dictionary 140 obtained by a process exhibiting high recall and high precision characteristics. The embodiments are not limited by this example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
    identifying, by a processor circuit, a string of characters indicative of a candidate acronym within a first portion of a document comprising at least two portions;
    extracting, by the processor circuit, text proximal to the identified string of characters, the text indicative of a definition for the candidate acronym;
    creating, by the processor circuit, a candidate acronym/definition pair comprising the identified string of characters and the extracted text;
    applying, by the processor circuit, a classification system to the candidate acronym/definition pair to create or update an acronym/definition pair dictionary specific to the document, wherein the classification system comprises a global classification model and a local classification model stored in a memory;
    iteratively training, by the processor circuit, the local classification model based on user feedback regarding an accuracy of the acronym/definition pair dictionary specific to the document;

applying, by the processor circuit, the trained local classification model to determine valid candidate acronym/definition pairs created from a second portion of the document; and updating, by the processor circuit, the acronym/definition pair dictionary to include the valid candidate acronym/definition pairs determined by the trained local classification model.

2. The method of claim 1, the identifying a string of characters comprising:

evaluating the string of characters against a regular expression indicative of an acronym structure, the regular expression comprising a combination of uppercase letters, numerals, and other non-letter/non-numeric symbols; and identifying the string of characters as a candidate acronym if it matches the regular expression.

3. The method of claim 2, the non-letter/non-numeric symbols including framing symbols.

4. The method of claim 1, the extracting text comprising:

(a) identifying a left window comprised of words to the left of the candidate acronym;

(b) identifying a right window comprised of words to the right of the candidate acronym;

(c) creating a left candidate definition starting with the closest word in the left window to the candidate acronym;

(d) creating a right candidate definition starting with the closest word in the right window to the candidate acronym;

(e) comparing the candidate definitions against a set of definition extraction heuristics wherein the left or right candidate definition is valid if it satisfies the set of definition extraction heuristics;

(f) adding the next word to the left candidate definition from the left window;

(g) adding the next word to the right candidate definition from the right window;

repeating (e) through (g) until all the words in the left and right windows have been added; and choosing either the left candidate definition or the right candidate definition as the candidate definition.

5. The method of claim 4, the set of definition extraction heuristics specifying that:

the candidate definition include no more than eight (8) words;

the first word of the left window is not a stop word;

the last word of the right window is not a stop word;

at least one letter in the candidate acronym is the first letter in some word in the candidate definition;

substantially all characters in the candidate acronym appear in the candidate definition;

the length of the candidate definition is less than one hundred (100) characters;

the candidate definition contains at least one lowercase letter;

the candidate acronym is not a substring of its candidate definition;

the new word in the candidate definition contains a letter from the candidate acronym; and the candidate acronym is compared with an acronym generated from the first letters of each word in the candidate definition in which the Levenshtein distance between the candidate acronym and generated acronym is less than two (2).

6. The method of claim 1, further comprising training the global classification model using a set of examples in the local classification model as determined by the user feedback.

7. An apparatus comprising:

a processor circuit;

a memory;

an acronym extraction module stored in the memory and executable by the processor circuit, the acronym extraction module to identify strings of characters indicative of candidate acronyms within a first portion of a document comprising at least two portions;

a definition extraction module stored in the memory and executable by the processor circuit, the definition extraction module to extract definitions for each selected string of characters from text within the document proximal to that string of characters; and a candidate refinement module stored in the memory and executable by the processor circuit, the candidate refinement extraction module to:

create candidate acronym/definition pairs for each selected string of characters based on the string of characters and its definition;

apply a classification system to the candidate acronym/definition pairs to create or update an acronym/definition pair dictionary specific to the document, wherein the classification system comprises a global classification model and a local classification model stored in the memory;

iteratively train the local classification model based on user feedback regarding an accuracy of the acronym/definition pair dictionary specific to the document;

apply the trained local classification model to determine valid candidate acronym/definition pairs created from a second portion of the document; and update the acronym/definition pair dictionary to include the valid candidate acronym/definition pairs determined by the trained local classification model.

8. The apparatus of claim 7, the acronym extraction module to:

evaluate strings of characters against a regular expression indicative of an acronym structure, the regular expression comprising a combination of alphanumeric symbols and non-alphanumeric symbols; and identify the string of characters as a candidate acronym if it matches the regular expression.

9. The apparatus of claim 8, wherein the non-alphanumeric symbols include framing symbols.

10. The apparatus of claim 9, the candidate refinement module to train the global classification model using a set of examples in the local classification model as determined by the user feedback.

11. An article of manufacture comprising a non-transitory computer-readable storage medium containing instructions that when executed enable a processor circuit to:

select strings of characters indicative of candidate acronyms within a portion of a document;

extract definitions for each selected string of characters from text within the document proximal to that string of characters;

create candidate acronym/definition pairs for each selected string of characters based on the string of characters and its definition;

apply a classification system to the candidate acronym/definition pairs to create or update an acronym/definition pair dictionary specific to the document;

apply the created or updated acronym/definition pair dictionary specific to the document to candidate acronym/definition pairs created from a second portion of the document, wherein the classification system comprises a global classification model and a local classification model stored in a memory;

iteratively train the local classification model based on user feedback regarding an accuracy of the acronym/definition pair dictionary specific to the document;

apply the trained local classification model to determine valid candidate acronym/definition pairs created from a second portion of the document; and update the acronym/definition pair dictionary to include the valid candidate acronym/definition pairs determined by the trained local classification model.

12. The article of claim 11, further comprising instructions that if executed enable the system to:

evaluate strings of characters against a regular expression indicative of an acronym structure, the regular expression comprising a combination of uppercase letters, numerals, and other non-letter/non-numeric symbols; and identify the string of characters as a candidate acronym if it matches the regular expression.

13. The article of claim 12, further comprising instructions that if executed enable the system to:

(a) identify a left window comprised of words to the left of the candidate acronym and a right window comprised of words to the right of the candidate acronym;

(b) create a left candidate definition starting with the closest word in the left window to the candidate acronym and a right candidate definition starting with the closest word in the right window to the candidate acronym;

(c) compare the candidate definitions against a set of heuristics wherein the left or right candidate definition is valid if it satisfies the set of heuristics;

(d) add the next word to the left candidate definition from the left window and add the next word to the right candidate definition from the right window;

repeat (c) and (d) until all the words in the left and right windows have been added; and choose either the left candidate definition or the right candidate definition as the candidate definition.

14. The article of claim 12, wherein the non-alphanumeric symbols include framing symbols.

\* \* \* \* \*